US011509832B2

United States Patent
Xiong et al.

(10) Patent No.: US 11,509,832 B2
(45) Date of Patent: Nov. 22, 2022

(54) LOW LIGHT SURVEILLANCE SYSTEM WITH DUAL VIDEO STREAMS

(71) Applicant: Western Digital Technologies, Inc., San Jose, CA (US)

(72) Inventors: Shaomin Xiong, Newark, CA (US); Pritam Das, Dublin, CA (US); Ramy Ayad, East Brunswick, NJ (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/176,591

(22) Filed: Feb. 16, 2021

(65) Prior Publication Data

US 2022/0174200 A1 Jun. 2, 2022

Related U.S. Application Data

(60) Provisional application No. 63/119,859, filed on Dec. 1, 2020.

(51) Int. Cl.
*H04N 5/235* (2006.01)
*H04N 5/262* (2006.01)

(52) U.S. Cl.
CPC ........... *H04N 5/2351* (2013.01); *H04N 5/262* (2013.01)

(58) Field of Classification Search
CPC .. H04N 5/2351; H04N 5/262; H04N 5/23229; H04N 5/23245; H04N 5/238
See application file for complete search history.

(56) References Cited

U.S. PATENT DOCUMENTS

| 10,645,344 | B2* | 5/2020 | Marman | G08B 13/19608 |
| 2007/0250898 | A1* | 10/2007 | Scanlon | H04N 7/18 725/135 |
| 2012/0062732 | A1 | 3/2012 | Marman et al. | |
| 2015/0334315 | A1 | 11/2015 | Teich et al. | |
| 2017/0034572 | A1 | 2/2017 | Marlatt et al. | |
| 2018/0152606 | A1* | 5/2018 | Edpalm | H04N 19/107 |
| 2018/0157939 | A1 | 6/2018 | Butt et al. | |
| 2019/0261491 | A1* | 8/2019 | Abalos | H05B 47/125 |

FOREIGN PATENT DOCUMENTS

| EP | 2905724 | 8/2015 |
| EP | 3481060 | 5/2017 |
| EP | 3328051 | 5/2018 |

OTHER PUBLICATIONS

International Search Report and Written Opinion for International Application No. PCT/US2021/031968, dated Aug. 12, 2021, 26 pgs.

* cited by examiner

*Primary Examiner* — Luong T Nguyen
(74) *Attorney, Agent, or Firm* — Patent Law Works LLP

(57) ABSTRACT

Systems and methods for a low light surveillance system with dual video streams are described. A video camera may include an image sensor and an infrared blocking filter. Responsive to detecting low light conditions, the infrared blocking filter may be disabled and the full spectrum video data from the camera may be sent in one video stream that is processed for user display, such as rendering in gray scale, and another video stream that is used for analytics processing, such as event detection.

20 Claims, 6 Drawing Sheets

LOW LIGHT SURVEILLANCE SYSTEM WITH DUAL VIDEO STREAMS

TECHNICAL FIELD

The present disclosure generally relates to video surveillance systems and, more particularly, to video surveillance systems for display and analysis in low light conditions.

BACKGROUND

Network-based video surveillance systems are a growing computing application in both business and personal markets. Some video surveillance systems may include one or more video cameras communicatively connected to a server, such as a network video recorder, through a wired interface, wired or wireless local area network, or wired or wireless wide area network, such as the internet. As video is recorded by the cameras, it is forwarded to the server system where it is stored and/or analyzed for subsequent retrieval. Client or user systems are communicatively connected to the server system to request, receive, and display streams of recorded video data and/or related alerts and analytics.

Some video surveillance systems may be configured for capturing low light video data. Many conventional image sensors are sensitive to infrared radiation, in addition to visible light. However, the infrared signals may impede or distort image data, particularly color data, under normal lighting conditions. Some video cameras may therefore be equipped with infrared blocking filters that are active when recording in normal lighting conditions to filter the infrared signals and prevent interference with the video image. These video surveillance systems may be configured to detect low light conditions and disable the infrared blocking filter to enable better night vision. Low light video captured using full spectrum images may appear distorted if rendered in color, so some surveillance systems convert the full spectrum video to gray scale for display to users.

While gray scale video may be more appealing for display to users, it may be less effective for some analytical systems, including event detection and/or facial or object recognition. Cost-effective surveillance systems that support both gray scale video displays and advanced analytics for low light conditions may be needed.

Backing up buffer data to a host memory buffer allocated to a peer storage device and/or accessing other host resources allocated to a peer storage device without relying on the host system may be advantageous. A reliable way of accessing host resources allocated to peer storage devices to enable host resource redundancy for peer storage devices without relying on the host to manage such redundancy and access privileges may be needed.

SUMMARY

Various aspects for low light surveillance systems with dual video streams, particularly support for gray scale video display and full spectrum video analytics, are described.

One general aspect includes a system that includes a video camera and a controller. The video camera may include an image sensor and an infrared blocking filter. The controller may be configured to: determine a low light condition; disable, responsive to determining the low light condition, the infrared blocking filter; send a first video stream from the image sensor to a user device for display; and send a second video stream from the image sensor to an analytics engine for processing.

Implementations may include one or more of the following features. The controller may be further configured to process, prior to sending the first video stream to the user device, the first video stream into a gray scale video stream. The system may include the user device including: a graphical user display configured to display the first video stream to a user of the user device; and an input device configured to selectively navigate the first video stream on the graphical user display. The analytics engine may include: a first analytical model configured to detect low light events from a full spectrum video stream, where the analytics engine is configured to use the first analytical model to process the second video stream; and a second analytical model configured to detect normal light events from an infrared filtered video stream. The analytics engine may be further configured to send, responsive to detected low light events, low light event parameters to the controller. The controller may be further configured to map the low light event parameters to the first video stream. The user device may be configured to: receive the first video stream and the low light event parameters; display the first video stream as a gray scale video on a graphical user display; and overlay, based on the low light event parameters, at least one low light event indicator on the gray scale video. The analytics engine may be further configured to: determine a set of low light training data may include pre-determined low light events in full spectrum video data; iteratively train, using the set of low light training data, the first analytical model; determine, based on the iterative training, a set of low light model weights for the first analytical model; and apply the set of low light model weights to processing the second video stream. The analytics engine may be further configured to: determine a set of normal light training data may include pre-determined normal light events in infrared filtered video data; iteratively train, using the set of normal light training data, the second analytical model; determine, based on the iterative training, a set of normal light model weights for the second analytical model; and apply, responsive to the controller determining a normal light condition, the set of normal light model weights to processing a normal light video stream from the image sensor. The system may further include a video storage device configured to store the first video stream and the user device, where the user device is configured to: selectively retrieve a portion of the first video stream from the video storage device; and display the portion of the first video stream on a graphical user display of the user device. The system may further include the analytics engine configured to detect low light events from the second video stream, where: the video storage device is further configured to store the second video stream; and the analytics engine is further configured to selectively retrieve the second video stream from the video storage device for processing.

Another general aspect includes a computer-implemented method including: determining a low light condition for a video camera, where the video camera may include an image sensor and an infrared blocking filter; disabling, responsive to determining the low light condition, the infrared blocking filter; sending a first video stream from the image sensor to a user device; and processing, using an analytics engine, a second video stream from the image sensor to detect low light events.

Implementations may include one or more of the following features. The computer-implemented method may include processing, prior to sending the first video stream to the user device, the first video stream into a gray scale video stream. The computer-implemented method may include:

displaying, on a graphical user display of the user device, the first video stream to a user of the user device; and selectively navigating, using an input device of the user device, the first video stream on the graphical user display. The computer-implemented method may include: detecting, using a first analytical model in the analytics engine, low light events from the second video stream, where the second video stream is a full spectrum video stream; and detecting, using a second analytical model in the analytics engine, normal light events from an infrared filtered video stream captured by the video camera during a normal light condition. The computer-implemented method may include mapping low light event parameters corresponding to the detected low light events from the second video stream to the first video stream. The computer-implemented method may include: receiving, at the user device, the first video stream and the low light event parameters; displaying, on a graphical user display of the user device, the first video stream as a gray scale video; and overlaying, based on the low light event parameters, at least one low light event indicator on the gray scale video. The computer-implemented method may include: determining a set of low light training data may include pre-determined low light events in full spectrum video data; iteratively training, using the set of low light training data, the first analytical model; determining, based on the iterative training, a set of low light model weights for the first analytical model; and applying the set of low light model weights to processing the second video stream. The computer-implemented method may include: determining a set of normal light training data may include pre-determined normal light events in infrared filtered video data; iteratively training, using the set of normal light training data, the second analytical model; determining, based on the iterative training, a set of normal light model weights for the second analytical model; and applying, responsive to determining a normal light condition, the set of normal light model weights to processing a normal light video stream from the image sensor. The computer-implemented method may include: storing the first video stream and the second video stream in a video storage device; selectively retrieving, by the user device, a first portion of the first video stream from the video storage device; displaying the first portion of the first video stream on a graphical user display of the user device; selectively retrieving, by the analytics engine, a second portion of the second video stream from the video storage device for processing; and detecting low light events from the second portion of the second video stream.

Still another general aspect includes a storage system including: a video camera including an image sensor and an infrared blocking filter; a processor; a memory; means for determining a low light condition for the video camera; means for disabling, responsive to determining the low light condition, the infrared blocking filter; means for displaying a first video stream from the image sensor on a graphical user display, where the first video stream is a gray scale video stream; and means for detecting low light events from a second video stream from the image sensor, where the means for displaying the first video stream overlays detected low light events from the second video stream on the first video stream.

The various embodiments advantageously apply the teachings of computer-based surveillance systems to improve the functionality of such computer systems. The various embodiments include operations to overcome or at least reduce the issues previously encountered in surveillance systems and, accordingly, are more effective and/or cost-efficient than other surveillance systems. That is, the various embodiments disclosed herein include hardware and/or software with functionality to improve low light surveillance using low cost image sensors, such as by using dual video streams for display and low light analytics. Accordingly, the embodiments disclosed herein provide various improvements to network-based video surveillance systems.

It should be understood that language used in the present disclosure has been principally selected for readability and instructional purposes, and not to limit the scope of the subject matter disclosed herein.

DETAILED DESCRIPTION

Figure 1:
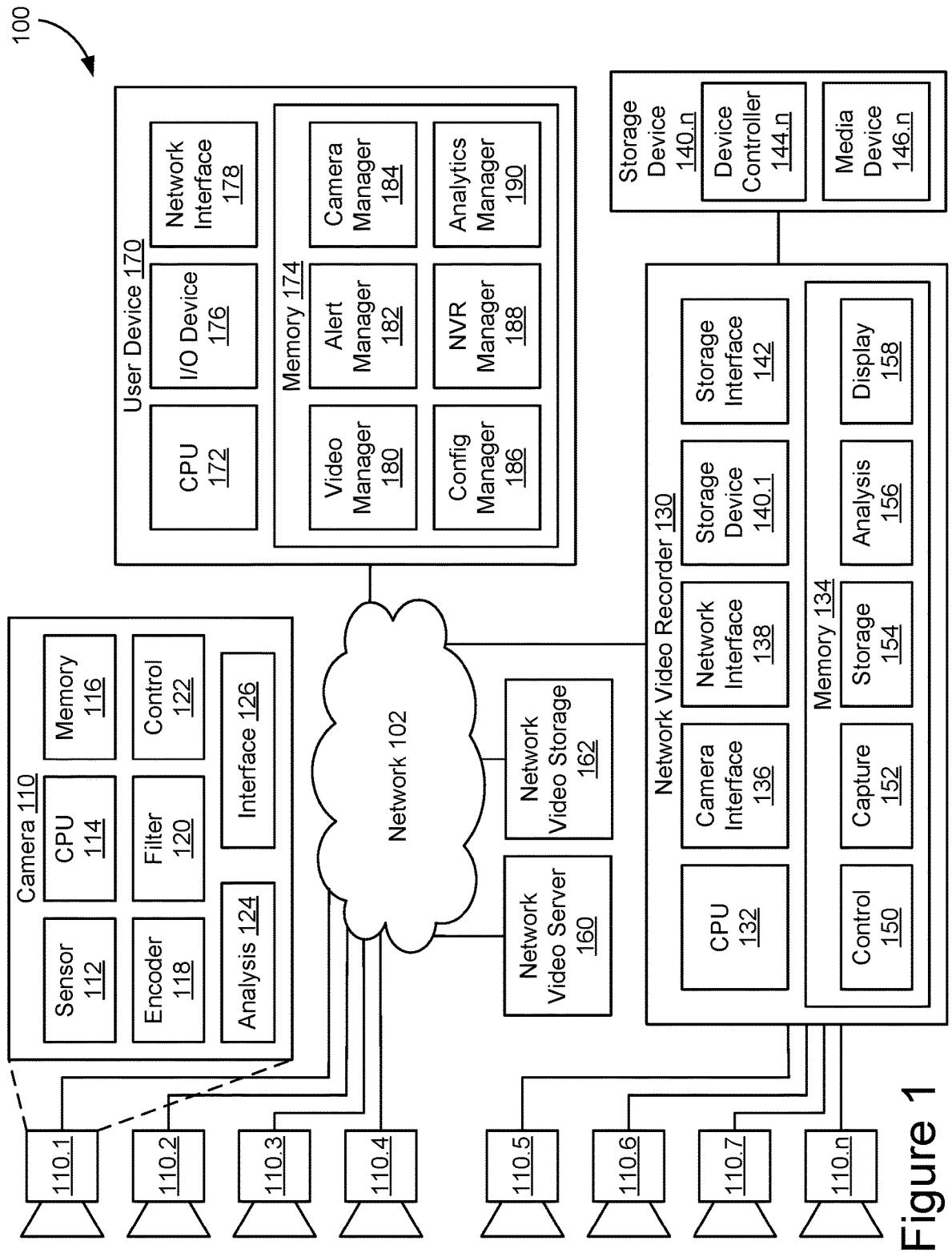
FIG. 1 schematically illustrates a computer-based surveillance system.

FIG. 1 shows an embodiment of an example video surveillance system 100 with multiple video cameras 110 interconnected to a network video recorder 130 for display of surveillance video on user device 170. While some example features are illustrated, various other features have not been illustrated for the sake of brevity and so as not to obscure pertinent aspects of the example embodiments disclosed herein. In some embodiments, cameras 110, network video recorder 130, and user device 170 are computer-based components that may be interconnected by a network 102. Additional components, such as network video server 160 and/or network video storage 162 may also be connected to network 102. In some embodiments, one or more cameras may connect directly to network video recorder 130, such as cameras 110.5-110.$n$ in FIG. 1, without communicating through network 102. Similarly, in alternate embodiments (not shown), user device 170 may connect directly to network video recorder 130.

In some embodiments, one or more networks 102 may be used to communicatively interconnect various components of surveillance system 100. For example, each component, such as cameras 110, network video recorder 130, external storage device 140.$n$, network video server 160, network video storage 162, and/or user device 170 may include one or more network interfaces and corresponding network protocols for communication over network 102. Network 102 may include a wired and/or wireless network (e.g., public and/or private computer networks in any number and/or configuration) which may be coupled in a suitable way for transferring data. For example, network 102 may include any means of a conventional data communication network such as a local area network (LAN), a wide area network (WAN), a telephone network, such as the public switched telephone network (PSTN), an intranet, the internet, or any other suitable communication network or combination of communication networks. In some embodiments, network 102 may comprise a plurality of distinct networks, subnetworks, and/or virtual private networks (VPN) may be used to limit communications among specific components. For example, cameras 110 may be on a limited access network such that video and control data may only be transmitted between cameras 110 and network video recorder 130, enabling network video recorder 130 to control access to cameras 110 and their video data.

Cameras 110 may include analog or digital cameras connected to an encoder that generates an encoded video stream with a defined resolution, aspect ratio, and video encoding format. In some embodiments, cameras 110 may include internet protocol (IP) cameras configured to encode their respective video streams and stream them over network 102 to network video recorder 130. In some embodiments (not shown), the encoder may reside in network video recorder 130. In some embodiments, cameras 110 may be configured to receive audio data through integrated or connected microphones (not shown) and include embedded and/or synchronized audio streams with their respective video streams. In some embodiments, video cameras 110 may include an image sensor 112, a processor or central processing unit CPU 114, a memory 116, an encoder 118, a filter 120, a control circuit 122, and/or a network interface 126. In some embodiments, video cameras 110 may include onboard analytics, such as a video analysis subsystem 124.

For example, image sensor 112 may include a solid state device configured to capture light waves and/or other electromagnetic waves and convert the light into an image, generally composed of colored pixels. Image sensor 112 may determine a base image size, resolution, bandwidth, depth of field, dynamic range, and other parameters of the video image frames captured. Image sensor 112 may include charged couple device (CCD), complementary metal oxide semiconductor (CMOS), and/or other image sensor devices of various sensor sizes and aspect ratios.

Digital video data from image sensor 112 may be received by processor 114 for (temporary) storage and processing in memory 116 and/or encoding by encoder 118. Processor 114 may include any type of conventional processor or microprocessor that interprets and executes instructions. Memory 116 may include a random access memory (RAM) or another type of dynamic storage device that stores information and instructions for execution by processor 114 and/or a read only memory (ROM) or another type of static storage device that stores static information and instructions for use by processor 114 and/or any suitable storage element such as a solid state storage element. Memory 116 may store basic input/output system (BIOS), firmware, and/or operating system instructions for initializing and executing the instructions and processes of cameras 110. Encoder 118 may use various possible digital encoding and/or compression formats for encoding the video stream received by image sensor 112. In some embodiments, encoder 118 may use a compressed video format to reduce the storage size and network bandwidth necessary for storing and transferring the original video stream. For example, encoder 118 may be configured to encode the video data as joint photographic expert group (JPEG), motion picture expert group (MPEG)-2, MPEG-4, advanced video coding (AVC)/H.264, and/or other video encoding standards or proprietary formats.

In some embodiments, one or more infrared (IR) blocking filters 120 may be selectively enabled to reduce the spectrum of light received by image sensor 112. For example, image sensor 112 may have a CCD sensor bandwidth of 400 nanometers (nm) to 1200 nm. Visible light may be 400-700 nm and near IR may be 700-1200 nm. IR blocking filter 120 may be enabled to reduce the bandwidth of the light received by image sensor 112 to the 400-700 nm range, i.e. visible light. When IR blocking filter 120 is disabled, image sensor 112 may capture the full spectrum of 400-1200 nm in video data. IR blocking filter 120 may be configured to block wavelengths above an upper limit of the visible light spectrum, generally 700-750 nm, to the upper limit of image sensor 112 itself, such as 1200-1400 nm.

Control circuit 122 may include a control circuit for managing the physical position of a camera 110. In some embodiments, camera 110 may be a pan-tilt-zoom (PTZ) camera that is capable of remote directional and zoom control. Control circuit 122 may be configured to receive motion commands through network interface 126 and/or through another interface, such as a dedicated remote-control interface, such short distance infrared signals, Bluetooth, etc. For example, network video recorder 130 and/or user device 170 may be configured to send PTZ commands to control circuit 122, which translates those commands into motor control signals for a plurality of actuators that control the position of camera 110. In some embodiments, control circuit 122 may include logic for automatically responding to movement detected through image sensor 112 to redirect camera 110 toward the source of movement. For example, an auto tracking feature may be embodied in firmware that enables the camera to estimate the size and position of an object based on changes in the pixels in the raw video stream from image sensor 112 and adjust the position of the camera to follow the moving object, returning to a default position when movement is no longer detected. In some embodiments, control circuit 122 may include logic for virtual PTZ or ePTZ, which enables a high-resolution camera to digitally zoom and pan to portions of the image collected by image sensor 112, with no physical movement of the camera. In some embodiments, control circuit 122 may include software and one or more application protocol interfaces (APIs) for enabling remote devices to control additional features and capabilities of camera 110. For example, control circuit 122 may enable network video recorder 130 and/or user device 170 to configure video formats, enable and disable filter 120, set motion detection, auto tracking, and similar features, and/or initiate video data streaming.

In some embodiments, video camera 110 may include video analysis subsystem 124 configured for onboard video analytics. For example, video analysis subsystem 124 may be configured to use CPU 114 and memory 116 to execute at least a portion of video analytics for video data captured by video camera 110. In some embodiments, video analysis subsystem 124 may be configured to operate similarly to video analysis subsystem 156 in network video recorder 130, as further described below, and embody one or more analytics engines and/or analytical model libraries.

Network interface 126 may include one or more wired or wireless connections to network 102 and/or a dedicated camera interface of network video recorder 130. For example, network interface 126 may include an ethernet jack and corresponding protocols for IP communication with network video recorder 130. In some embodiments, network interface 126 may include a power over ethernet (PoE) connection with network video recorder 130 or another camera access point. PoE may enable both power for camera 110 and network data to travel on the same wire. In some embodiments, network interface 126 may enable an IP camera to be configured as a network resource with an IP address that is accessible on a LAN, WAN, or the internet. For example, network video recorder 130 and/or user device 170 may be configured to selectively receive video from cameras 110 from any internet-connected location using internet addressing and security protocols.

Network video recorder 130 may include a computer system configured as a video storage device to record the video streams from cameras 110. For example, network video recorder 130 may be configured to receive video streams from each of cameras 110 for storage, analysis, and/or display through user device 170. In some embodiments, cameras 110 may send encoded video streams based on the raw image data collected from their respective image sensors 112, with or without video data compression. A single video stream may be received from each camera 110 and network video recorder 130 may be configured to receive video streams from all connected cameras in parallel, as network bandwidth and processing resources allow.

Network video recorder 130 may include a housing and a bus interconnecting at least one processor or CPU 132, at least one memory 134, at least one storage device 140, and at least one interface, such as camera interface 136, network interface 138, and/or storage interface 142. The housing (not shown) may include an enclosure for mounting the various subcomponents of network video recorder 130, locating any physical connectors for the interfaces, and protecting the subcomponents. Some housings may be configured for mounting within a rack system. The bus (not shown) may include one or more conductors that permit communication among the components of network video recorder 130. Processor 132 may include any type of processor or microprocessor that interprets and executes instructions or operations. Memory 134 may include a random access memory (RAM) or another type of dynamic storage device that stores information and instructions for execution by processor 132 and/or a read only memory (ROM) or another type of static storage device that stores static information and instructions for use by processor 132 and/or any suitable storage element.

In some embodiments, network video recorder 130 may include camera interface 136 configured for connection with one or more cameras 110. For example, camera interface 136 may include a plurality of ethernet ports and supporting protocols compatible with PoE standards for connecting to cameras 110.5-110.n. In some embodiments, camera interface 136 may include a PoE network switch for providing power to connected cameras and routing data packets to and from cameras 110.5-110.n, such as control and video data. In some embodiments, network video recorder 130 may not include a dedicated camera interface 136 and may use network interface 138 for communication with cameras 110 over network 102.

Network interface 138 may include one or more wired or wireless network connections to network 102. Network interface 138 may include a physical interface, such as an ethernet port, and related hardware and software protocols for communication over network 102, such as a network interface card.

Storage devices 140 may include one or more non-volatile memory devices configured to store video data, such as a hard disk drive (HDD) or solid state drive (SSD). In some embodiments, storage device 140 is, or includes, a plurality of solid-state drives (SSDs). In some embodiments, network video recorder 130 may include internal storage device 140.1 and expandable storage that enables additional storage devices 140.n to be connected via storage interface 142. Each storage device 140 may include a non-volatile memory (NVM) or device controller 144 based on compute resources (processor and memory) and a plurality of NVM or media devices 146 for data storage (e.g., one or more NVM device(s), such as one or more flash memory devices). In some embodiments, a respective data storage device 140 of the one or more data storage devices includes one or more NVM controllers, such as flash controllers or channel controllers (e.g., for storage devices having NVM devices in multiple memory channels). In some embodiments, storage devices 140 may each be packaged in a housing, such as a multi-part sealed housing with a defined form factor and ports and/or connectors for interconnecting with storage interface 142. Storage device 140.1 and each expanded storage devices 140.n may be of the same storage device type or a different storage device type.

In some embodiments, a respective data storage device 140 may include a single medium device, while in other embodiments the respective data storage device 140 includes a plurality of media devices. In some embodiments, media devices include NAND-type flash memory or NOR-type flash memory. In some embodiments, storage device 140 may include one or more hard disk drives (HDDs). In some embodiments, storage devices 140 may include a flash memory device, which in turn includes one or more flash memory die, one or more flash memory packages, one or more flash memory channels or the like. However, in some embodiments, one or more of the data storage devices 140 may have other types of non-volatile data storage media (e.g., phase-change random access memory (PCRAM), resistive random access memory (ReRAM), spin-transfer torque random access memory (STT-RAM), magneto-resistive random access memory (MRAM), etc.).

In some embodiments, each storage device 140 includes a device controller 144, which includes one or more processing units (also sometimes called CPUs or processors or microprocessors or microcontrollers) configured to execute instructions in one or more programs. In some embodiments, the one or more processors are shared by one or more components within, and in some cases, beyond the function of the device controllers. Media devices 146 are coupled to device controllers 144 through connections that typically convey commands in addition to data, and optionally convey metadata, error correction information and/or other information in addition to data values to be stored in media devices and data values read from media devices 146. Media devices 146 may include any number (i.e., one or more) of memory devices including, without limitation, non-volatile semiconductor memory devices, such as flash memory device(s). In some embodiments, media devices 146 may include NAND or NOR flash memory devices comprised of single level cells (SLC), multiple level cell (MLC), or triple-level cells.

In some embodiments, media devices 146 in storage devices 140 are divided into a number of addressable and individually selectable blocks, sometimes called erase blocks. In some embodiments, individually selectable blocks are the minimum size erasable units in a flash memory device. In other words, each block contains the minimum number of memory cells that can be erased simultaneously (i.e., in a single erase operation). Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector or codeword, which is a subunit of a page. That is, a block includes a plurality of pages, each page contains a plurality of sectors or codewords, and each sector or codeword is the minimum unit of data for reading data from the flash memory device.

A data unit may describe any size allocation of data, such as host block, data object, sector, page, multi-plane page, erase/programming block, media device/package, etc. Storage locations may include physical and/or logical locations on storage devices 140 and may be described and/or allocated at different levels of granularity depending on the storage medium, storage device/system configuration, and/or context. For example, storage locations may be allocated at a host logical block address (LBA) data unit size and addressability for host read/write purposes but managed as pages with storage device addressing managed in the media flash translation layer (FTL) in other contexts. Media segments may include physical storage locations on storage devices 140, which may also correspond to one or more logical storage locations. In some embodiments, media segments may include a continuous series of physical storage location, such as adjacent data units on a storage medium, and, for flash memory devices, may correspond to one or more media erase or programming blocks. A logical data group may include a plurality of logical data units that may be grouped on a logical basis, regardless of storage location, such as data objects, video media files, or other logical data constructs composed of multiple host blocks. In some embodiments, storage device 140 may be configured specifically for managing the storage and overwriting of video data in a continual monitoring application for video surveillance.

Storage interface 142 may include a physical interface for connecting to one or more external storage devices using an interface protocol that supports storage device access. For example, storage interface 142 may include a peripheral component interconnect express (PCIe), serial advanced technology attachment (SATA), small computer system interface (SCSI), serial attached SCSI (SAS), universal serial bus (USB), Firewire, or similar storage interface connector supporting storage protocol access to storage devices 140.n. In some embodiments, storage interface 142 may include a wireless data connection with sufficient bandwidth for video data transfer. Depending on the configuration and protocols used by storage interface 142, storage device 140.n may include a corresponding interface adapter, firmware, and/or protocols for receiving, managing, and responding to storage commands from network video recorder 130.

Network video recorder 130 may include a plurality of modules or subsystems that are stored and/or instantiated in memory 134 for execution by processor 132 as instructions or operations. For example, memory 134 may include a camera control subsystem 150 configured to control cameras 110. Memory 134 may include a video capture subsystem 152 configured to receive video streams from cameras 110. Memory 134 may include a video storage subsystem 154 configured to store received video data in storage device(s) 140 and/or network video storage 162. Memory 134 may include a video analysis subsystem configured to analyze video streams and/or video data for defined events, such as motion, recognized objects, recognized faces, and combinations thereof. Memory 134 may include a video display subsystem configured to selectively display video streams on user device 170, which may be attached to network video recorder 130 or remotely connected via network 102.

In some embodiments, camera control subsystem 150 may include interface protocols and a set of functions and parameters for using, configuring, communicating with, and providing command messages to cameras 110. For example, camera control subsystem 150 may include an API and command set for interacting with control circuit 122 to access one or more camera functions. In some embodiments, camera control subsystem 150 may be configured to set video configuration parameters for image sensor 112 and/or video encoder 118, manage IR blocking filter 120, access pan-tilt-zoom features of control circuit 122, set or modify camera-based motion detection, tripwire, and/or low light detection parameters in memory 116, and/or otherwise manage operation of cameras 110. For example, camera control subsystem 150 may maintain a video camera configuration table, pages, or similar data structures that includes entries for each video camera being managed and their respective camera-specific configuration parameters, active control features (such as PTZ control), and other configuration and control information for managing cameras 110. In some embodiments, each camera 110 may be assigned a unique camera identifier that may be used by camera control subsystem 150, video capture subsystem 152, and/or other subsystems to associate video data with the camera from which it was received.

In some embodiments, video capture subsystem 152 may include interface protocols and a set of functions and parameters for receiving video streams from cameras 110. For example, video capture subsystem 152 may include video data channels and related data buffers for managing a plurality of camera video data streams. In some embodiments, each video camera 110 may be allocated a dedicated video channel for continuously and/or selectively sending its video stream to network video recorder 130. Video capture subsystem 152 may be configured to pass each received video stream to video storage subsystem 154, video analysis subsystem 156, and/or video display subsystem 158. For example, received video streams may be buffered by video capture subsystem 152 before being streamed to video storage subsystem 154 and split into dual video streams with different video parameters for video analysis subsystem 156 and video display subsystem 158.

In some embodiments, video storage subsystem 154 may include interface protocols and a set of functions and parameters for managing storage of video data in storage devices 140 and/or network video storage 162 for later retrieval and use by video analysis subsystem 156 and/or video display subsystem 158. For example, video storage subsystem 154 may write camera video stream data from video data buffers to non-volatile storage in storage devices 140 and video analysis subsystem 156 and/or video display subsystem 158 may be configured to selectively read video data from storage devices 140. In some embodiments, video storage subsystem 154 may include management of video storage space in storage devices 140 and/or network video storage 162 in accordance with one or more data retention and/or data archiving schemes. For example, surveillance system 100 may support continuous and/or triggered recording of video data from cameras 110 and video storage subsystem 154 may include logic for enforcing a data retention and overwriting policy whereby the fixed storage space of storage devices 140 is recycled for storing a recent period of captured video, video data meeting specific retention criteria, and/or deleting or archiving video data after one or more periods of time defined in the data retention policy. In some embodiments, video storage subsystem 154 may include or access video decoders and/or encoders for storing video data in a storage video format that is different than the camera video format, such as using a different codec, compression factor, frame rate, resolution, image size, etc.

In some embodiments, video analysis subsystem 156 may include interface protocols and a set of functions and parameters for analyzing video data from cameras 110. For example, video analysis subsystem 156 may be configured to run one or more event detection algorithms for determining, tagging, and/or initiating alerts or other actions in response to detected video events. In some embodiments, video analysis subsystem 156 may be configured to tag or build metadata structures that map detected events to time and image location markers for the video stream from which they are detected. For example, video analysis subsystem 156 may use motion, tripwire, object recognition, facial recognition, audio detection, speech recognition, and/or other algorithms to determine events occurring in a video stream and tag them in a corresponding metadata track and/or separate metadata table associated with the video data object. In some embodiments, video streams and/or portions thereof may be tagged with low light condition markers or tags. For example, camera 110 may embed time markers and low light condition tags for video portions captured using low light settings and/or video analysis subsystem 156 may determine a low light condition from the light, color, and/or wavelength bandwidth present in the video data and add appropriate tags. In some embodiments, video analysis subsystem 156 may include event handling logic for determining response to detection of one or more detected events, such as raising an alert to user device 170 or triggering selective display of a video stream including the detected event through video display subsystem 158. In some embodiments, video analysis subsystem 156 may operate in real-time or near real-time on video data received by video capture subsystem 152, delayed processing of video data stored by video storage subsystem 154, and/or a combination thereof based on the nature (and processing requirements) of the video events, volume of video to be processed, and other factors. In some embodiments, video analysis subsystem 156 may comprise one or more analytics engines configured for a particular type of event and corresponding event detection algorithm or model.

In some embodiments, video display subsystem 158 may include interface protocols and a set of functions and parameters for displaying video from video capture subsystem 152 and/or video storage subsystem 154 on user device 170. For example, video display subsystem 158 may include a monitoring or display configuration for displaying one or more video streams in real-time or near real-time on a graphical user display of user device 170 and/or receive video navigation commands from user device 170 to selectively display stored video data from video storage subsystem 154. In some embodiments, video display subsystem 158 may maintain an index of real-time/near real-time video streams and/or stored or archived video streams that are available for access by user device 170. In some embodiments, the video index may include a corresponding metadata index that includes video data parameters (e.g., time, location, camera identifier, format, low light/normal light, etc.), detected video event metadata (event time, location, type, parameters, etc.), and/or video management parameters (expiration, active/archive, access control, etc.) for use in displaying and managing video data. Video display subsystem 158 may be configured to support user device 170 when directly attached to network video recorder 130 and/or via network 102 within a LAN, WAN, VPN, or the internet.

In some embodiments, surveillance system 100 may include one or more remote and/or cloud-based resources for supporting the functions of network video recorder 130 and/or user device 170. For example, surveillance system 100 may include a network video server 160 configured to host some, all, or select portions of the functions of network video recorder 130, such as a cloud-based server system. As another example, surveillance system 100 may include network video storage 162 for storing active and/or archived video data, supplementing and/or replacing storage devices 140, such as a cloud-based network attached storage system or distributed storage system. In some embodiments, the majority of functions described above for network video recorder 130 may reside in network video recorder 130 and select functions may be configured to leverage additional resources in network video server 160 and/or network video storage 162. For example, network video server 160 may be configured to support specialized and/or processing intensive event detection algorithms to supplement video analysis subsystem 156 and/or network video storage 162 may be configured to support archiving of inactive video data for longer term storage.

User device 170 may be any suitable computer device, such as a computer, a computer server, a laptop computer, a tablet device, a netbook, an internet kiosk, a personal digital assistant, a mobile phone, a smart phone, a gaming device, or any other computing device. User device 170 is sometimes called a host, client, or client system. In some embodiments, user device 170 may host or instantiate one or more applications for interfacing with surveillance system 100. For example, use device 170 may be a personal computer or mobile device running a surveillance monitoring and management application configured to provide a user interface for network video recorder 130. In some embodiments, user device 170 may be configured to access cameras 110 and/or their respective video streams through network video recorder 130 and/or directly through network 102. In some embodiments, one or more functions of network video recorder 130 may be instantiated in user device 170 and/or one or more functions of user device 170 may be instantiated in network video recorder 130.

User device 170 may include one or more processors or CPUs 172 for executing compute operations or instructions stored in memory 174 for accessing video data and other functions of network video recorder 130 through network 102. In some embodiments, processor 172 may be associated with memory 174 and input/output device 176 for executing both video display operations and surveillance system management operations. Processor 172 may include any type of processor or microprocessor that interprets and executes instructions or operations. Memory 174 may include a random access memory (RAM) or another type of dynamic storage device that stores information and instructions for execution by processor 172 and/or a read only memory (ROM) or another type of static storage device that stores static information and instructions for use by processor 172 and/or any suitable storage element. In some embodiments, user device 170 may allocate a portion of memory 174 and/or another local storage device (in or attached to user device 170) for storing selected video data for user device 170. In some embodiments, user device 170 may include one or more I/O devices 176. For example, a graphical display, such as a monitor and/or touch screen display, and/or other user interface components such as a keyboard, a mouse, function buttons, speakers, vibration motor, a track-pad, a pen, voice recognition, biometric mechanisms, and/or any number of supplemental devices to add functionality to user device 170. Network interface 178 may include one or more wired or wireless network connections to network 102. Network interface 178 may include a physical interface, such as an ethernet port, and/or related hardware and software protocols for communication over network 102, such as a network interface card, wireless network adapter, and/or cellular data interface.

User device 170 may include a plurality of modules or subsystems that are stored and/or instantiated in memory 174 for execution by processor 172 as instructions or operations. For example, memory 174 may include a video manager 180 configured to provide a user interface for selectively navigating and displaying real-time, near real-time, and/or stored video streams. Memory 174 may include alert manager 182 configured to provide a user interface for setting, monitoring, and displaying alerts based on video events. Memory 174 may include a camera manager 184 configured to provide a user interface for identifying, configuring, and managing cameras 110. Memory 174 may include a configuration manager 186 to provide a user interface for setting and managing system settings, user access controls, storage options, and other configuration settings for surveillance system 100. Memory 174 may include a network video recorder manager 188 configured to provide a user interface for identifying, configuring, and managing network video recorder 130 and/or multiple network video recorders. Memory 174 may include an analytics manager configured to provide a user interface for selecting, training, and managing event detection algorithms for surveillance system 100.

In some embodiments, video manager 180 may include interface protocols and a set of functions and parameters for navigating and displaying video streams from cameras 110. For example, video manager 180 may include a graphical user interface and interactive controls for displaying lists, tables, thumbnails, or similar interface elements for selecting and displaying video streams for particular cameras, times, locations, and/or events. In some embodiments, video manager 180 may enable split screen display of multiple camera video streams. For example, the near real-time video streams (with a predetermined lag based on network lag, storage, and processing times) from all active cameras may be displayed on a monitoring interface or a set of video streams corresponding to a detected event may be displayed in an event review interface. In some embodiments, video manager 180 may include a data structure summarizing all video data stored in surveillance system 100 to enable the user to locate and view older surveillance video. For example, a video management log or database may include entries for stored video data indexed by related metadata, such as video data parameters (e.g., time, location, camera identifier, format, low light/normal light, etc.), detected video event metadata (event time, location, type, parameters, etc.), and/or video management parameters (expiration, active/archive, access control, etc.). In some embodiments, video manager 180 may be configured to interface with video display subsystem 158 and/or storage subsystem 154 for determining and retrieving selected video data.

In some embodiments, alert manager 182 may include interface protocols and a set of functions and parameters for setting, monitoring, and displaying alerts based on video events. For example, the user may define a set of trigger events that generate visual, audible, tactile, and/or notification-based (electronic mail, text message, automated call, etc.) alert to user device 170. In some embodiments, alert manager 182 may include a plurality of preset alert conditions with associated event parameters and allow a user to enable and disable alert types and/or change associated event parameters. In some embodiments, alert manager 182 may be configured to overlay graphical elements representing detected events or event indicators on video streams displayed through video manager 180. For example, detected motion, objects, or faces may be boxed or highlighted, tagged with relevant identifiers, or otherwise indicated in the video playback on user device 170. In some embodiments, alert manager 182 may be configured to interface with video analysis subsystem 156, video capture subsystem 152, and/or directly with cameras 110 for receiving event notifications or parameters.

In some embodiments, camera manager 184 may include interface protocols and a set of functions and parameters for identifying, configuring, and managing cameras 110. Configuration manager 186 may include interface protocols and a set of functions and parameters for setting and managing system settings, user access controls, storage options, and other configuration settings. Network video recorder (NVR) manager 188 may include interface protocols and a set of functions and parameters for identifying, configuring, and managing network video recorder 130. For example, each of camera manager 184, configuration manager 186, and/or NVR manager 188 may include a series of graphical user interfaces for displaying their respective component identifiers and related configuration parameters and enabling the user to view and/or change those parameters for managing surveillance system 100 and its component systems. In some embodiments, camera manager 184, configuration manager 186, and/or NVR manager 188 may provide changes parameters to the effected components, such as camera manager 184 sending camera configuration parameter changes to selected cameras 110, NVR manager 188 sending NVR configuration parameter changes to network video recorder 130, and/or configuration manager 186 sending system configuration parameter changes to all effected components.

In some embodiments, analytics manager 190 may include interface protocols and a set of functions and parameters for selecting, training, and managing event detection algorithms. For example, analytics manager 190 may include a library of event detection algorithms for different event types. In some embodiments, the event detection algorithms may include a set of parameters and/or model weights that are preconfigured based on training data sets processed independent of surveillance system 100. For example, analytics manager 190 may include object detection algorithms for common objects, situations, and camera configurations. In some embodiments, analytics manager 190 may include preconfigured training data sets and/or allow the user to define training data sets for determining or refining event detection algorithm parameters and/or model weights based on predefined base algorithms or models. In some embodiments, analytics manager 190 may interface with analysis subsystem 156 for using the event detection algorithms configured through analytics manager 190 to process video data received by network video recorder 130 and/or selecting, training, and managing those algorithms.

Figure 2:
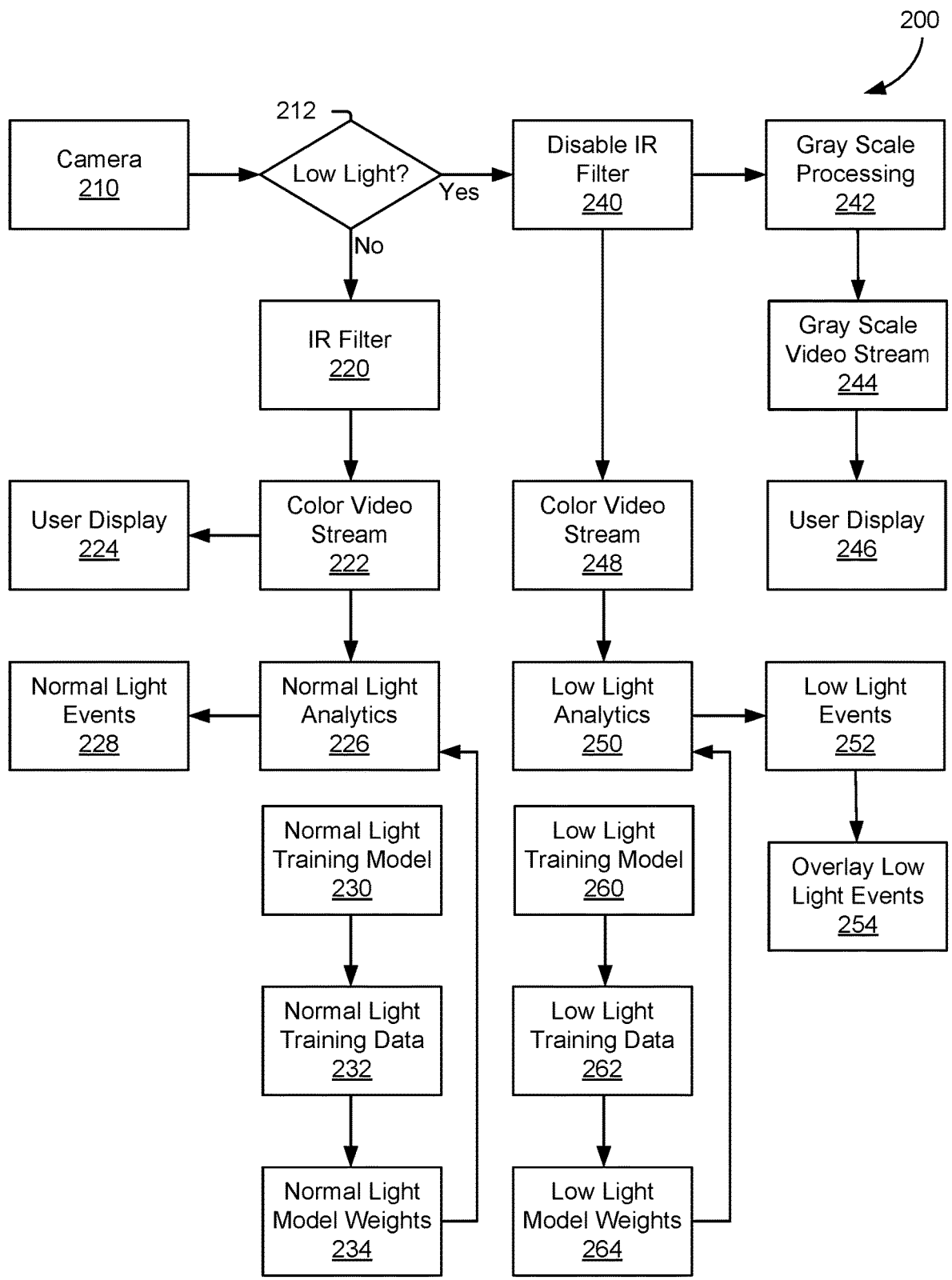
FIG. 2 schematically illustrates low light video handling that may be used by the computer-based surveillance system of FIG. 1.

FIG. 2 shows a schematic representation of low light video handling that may be implemented in a computer-based surveillance system, such as surveillance system 100 in FIG. 1. Video camera 210, similar to cameras 110 in FIG. 1, may be configured to capture image data from light waves striking an image sensor. At block 212, whether or not a low light condition is present in the image data may be determined. For example, video camera 210 may include an automated control circuit that determines from the illumination level of the pixels in the image sensor whether or not a low light threshold has been met and a low light condition is present. In another example, low light detection may be a function of a network video recorder, such as network video recorder 130 in FIG. 1, receiving the video data from camera 210. The network video recorder may process the real-time video stream from the camera to determine whether a low light condition exists (such as using an illumination threshold across the pixels in a frame of video data) and persists for a predetermined illumination change response period (a time buffer to prevent overly frequent changes between normal light and low light settings). If the low light threshold is met for the change response time, then a low light condition is detected. Otherwise, a normal light condition may be the default conditions.

If no low light condition is detected at block 212, then infrared filter 220 is enabled or remains enabled, corresponding to a normal light condition. Camera 210 may generate a color video stream 222 with an IR blocking filter, such as IR blocking filter 120 in FIG. 1, filtering out near infrared wavelengths outside the visible light spectrum. For example, the IR filtered color video stream 222 may include wavelengths of 400-700 nm to avoid additional noise and color distortions that may occur if near infrared signals are included under normal light conditions. A user display 224, such as a graphical user display on user device 170, may display color video stream 222 to a user for monitoring or review.

In addition, color video stream 222 may be provided to normal light analytics 226, such as one or more normal light event detection algorithms in video analysis subsystem 156 in FIG. 1. One or more normal light events 228 may be detected by normal light analytics 226 during the processing of color video stream 222. For example, video analysis subsystem 156 may process color video data from cameras 110 under normal light conditions using normal light event detection algorithms. Any detected normal light events 228 may be identified in metadata associated with color video stream 222 and/or sent in detected normal light event alerts to user device 170.

In some embodiments, normal light analytics 226 may be based on training one or more event detection algorithms or models with normal light video data. A normal light training model 230 may be selected by determining an event detection algorithm for the event type of interest, such as motion, object, or facial recognition, and applying a normal light training data set 232 to iteratively training the event detection algorithm. Normal light training data set 232 may include video data taken during normal light conditions with known events, such as manually tagged events. Iterative training using normal light training data 232 may result in a trained normal light model weights 234. These normal light model weights may be provided to normal light analytics 226 to provide normal light event detection.

If a low light condition is detected at block 212, then the infrared blocking filter may be disabled at block 240 and dual video streams may be generated for different paths. Disabling the IR blocking filter may generate a wider bandwidth video stream responsive to near infrared light waves above the visible light spectrum, such as 700-1400 nm, resulting in a full spectrum video stream of 400-1400 nm.

On a display path, gray scale processing 242 may be applied to the raw or encoded full spectrum video stream from camera 210 to generate a gray scale video stream 244. For example, a control circuit in camera 210 may enable gray scale processing 242 to remove the color data from the full spectrum color video stream and generate gray scale video stream 244. In another example, camera 210 provides the full spectrum color video stream to the network video recorder. The network video recorder splits or replicates the full spectrum color video stream and a video display subsystem, such as video display subsystem 158, executes gray scale processing before providing gray scale video stream 244 to user display 246. In still another example, the full spectrum color video stream is sent by the video display subsystem to the user device and the user device executed gray scale processing before displaying the video stream to the user.

On an analytics path, full spectrum color video stream 248 is provided to low light analytics 250, such as one or more low light event detection algorithms in video analysis subsystem 156 in FIG. 1. One or more low light events 252 may be detected by low light analytics 250 during the processing of full spectrum color video stream 248. For example, video analysis subsystem 156 may process full spectrum color video data from cameras 110 under low light conditions using low light event detection algorithms. Any detected low light events 252 may be identified in metadata associated with color video stream 248 and/or sent in detected low light event alerts to user device 170. At block 254, low light events 252 may be overlaid on gray scale video stream 244 on user display 246. For example, video display subsystem 158 may map the low light event parameters from metadata associated with color video stream 248 to timing and locations in gray scale video stream 244. When gray scale video stream 244 is displayed, user device 170 may overlay low light event indicators, such as highlights, boxes, tiles, or labels, in the times and locations identified from the low light event parameters in the mapped metadata.

In some embodiments, low light analytics 250 may be based on training one or more event detection algorithms or models with low light video data. A low light training model 260 may be selected by determining an event detection algorithm for the event type of interest, such as motion, object, or facial recognition, and applying a low light training data set 262 to iteratively training the event detection algorithm. Low light training data set 262 may include video data taken during low light conditions with known events, such as manually tagged events. Iterative training using low light training data 262 may result in trained low light model weights 264. These low light model weights may be provided to low light analytics 250 to provide low light event detection. In some embodiments, normal light analytics 226 and low light analytics 250 may start with the same event detection algorithm for the same event type of interest and the different training data and resulting model weights may result in different normal light and low light event detection algorithms.

Figure 3:
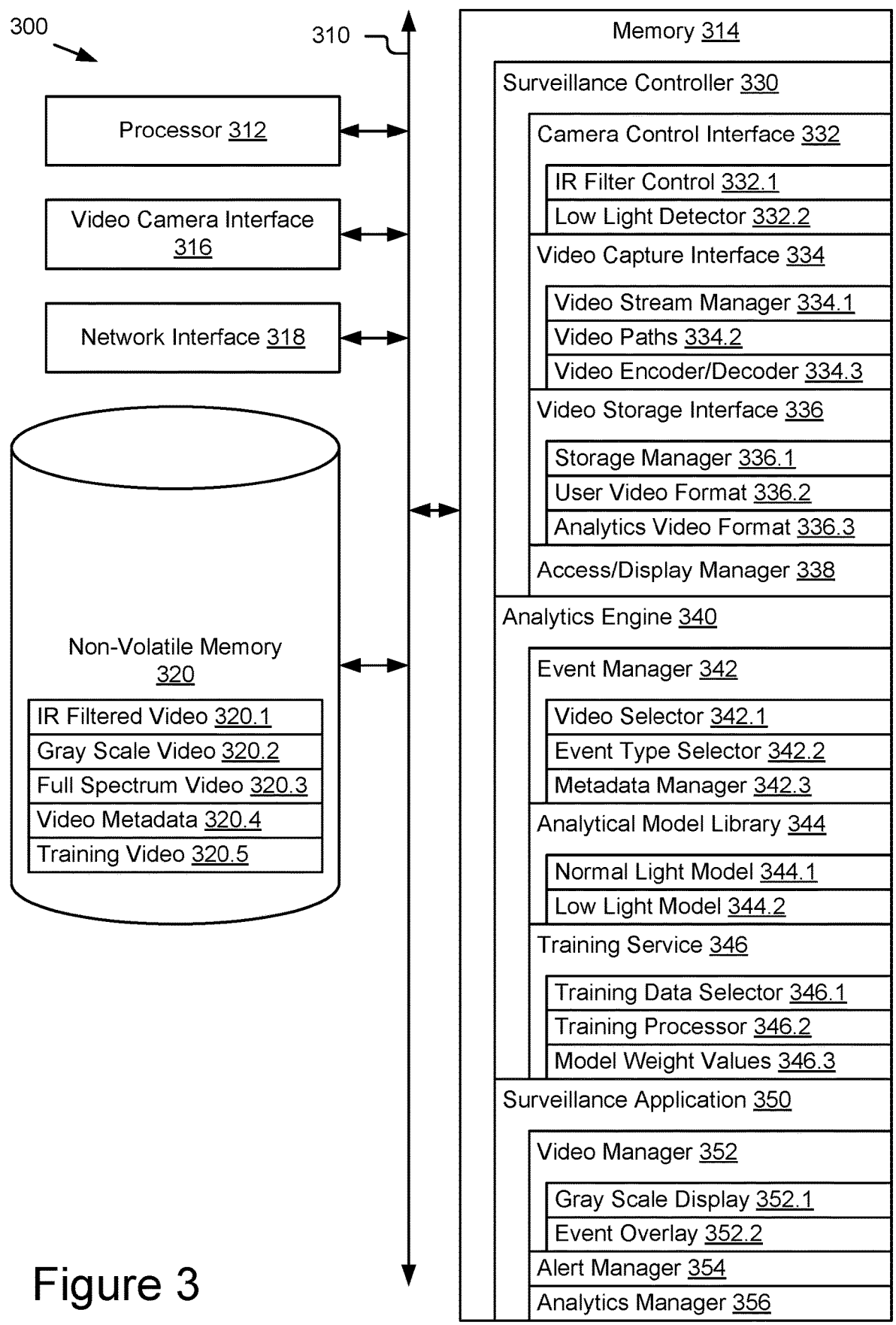
FIG. 3 schematically illustrates some elements of the computer-based surveillance system of FIG. 1.

FIG. 3 schematically shows selected modules of a surveillance system 300 configured for dual video streams in low light conditions. Surveillance system 300 may incorporate elements and configurations similar to those shown in FIGS. 1-2. For example, surveillance system 300 may be configured in a network video recorder similar to network video recorder 130. In some embodiments, one or more of the selected modules may access or be instantiated in the processors, memories, and other resources of video cameras configured for video capture, similar to video cameras 110, and/or user devices configured for video monitoring, similar to user device 170.

Surveillance system 300 may include a bus 310 interconnecting at least one processor 312, at least one memory 314, and at least one interface, such as video camera interface 316 and network interface 318. Bus 310 may include one or more conductors that permit communication among the components of surveillance system 300. Processor 312 may include any type of processor or microprocessor that interprets and executes instructions or operations. Memory 314 may include a random access memory (RAM) or another type of dynamic storage device that stores information and instructions for execution by processor 312 and/or a read only memory (ROM) or another type of static storage device that stores static information and instructions for use by processor 312 and/or any suitable storage element such as a hard disk or a solid state storage element.

Video camera interface 316 may be configured for connection with one or more video cameras. For example, video camera interface 316 may include a plurality of ethernet ports and supporting protocols compatible with PoE standards for connecting to a plurality of cameras. In some embodiments, video camera interface 316 may include a PoE network switch for providing power to connected cameras and routing data packets to and from connected cameras, such as control and video data.

Network interface 318 may include one or more wired or wireless network connections to network, similar to network 102. Network interface 318 may include a physical interface, such as an ethernet port, and related hardware and software protocols for communication over the network, such as a network interface card or wireless adapter.

Surveillance system 300 may include one or more non-volatile memory devices 320 configured to store video data. For example, non-volatile memory devices 320 may include a plurality of flash memory packages organized as an addressable memory array and/or one or more solid state drives or hard disk drives. In some embodiments, non-volatile memory devices 320 may include a plurality of storage devices within, attached to, or accessible by a network video recorder for storing and accessing video data.

Surveillance system 300 may include a plurality of modules or subsystems that are stored and/or instantiated in memory 314 for execution by processor 312 as instructions or operations. For example, memory 314 may include a surveillance controller 330 configured to control a plurality of video cameras, capture and store video streams from those cameras, and enable user access, such as through surveillance application 350. Memory 314 may include an analytics engine configured to analyze video data to detect events for use by surveillance controller 330 and/or surveillance application 350. Memory 314 may include a surveillance application configured to provide a user interface for monitoring, reviewing, and managing surveillance video and/or surveillance system 300.

Surveillance controller 330 may include interface protocols, functions, parameters, and data structures for connecting to and controlling cameras, capturing and storing video data from those cameras, and interfacing with analytics engine 340 and surveillance application 350. For example, surveillance controller 330 may be an embedded firmware application and corresponding hardware in a network video recorder configured for network and/or direct communication with a set of associated video cameras. Surveillance controller 330 may be configured as a central collection point for video streams from the associated video cameras that enables analysis of captured video data by analytics engine 340 and presentation of video streams and video event alerts to a user through surveillance application 350.

In some embodiments, surveillance controller 330 may include a plurality of hardware and/or software modules configured to use processor 312 and memory 314 to handle or manage defined operations of surveillance controller 330. For example, surveillance controller 330 may include a camera control interface 332, a video capture interface 334, a video storage interface 336, and an access and display manager 338.

Camera control interface 332 may include camera interface protocols and a set of functions, parameters, and data structures for using, configuring, communicating with, and providing command messages to cameras through video camera interface 316 and/or network interface 318. For example, camera control interface 332 may include an API and command set for interacting with control circuit in each camera to access one or more camera functions. In some embodiments, camera control interface 332 may be configured to set video configuration parameters for camera image sensors, microphones, and/or video encoders, access pan-tilt-zoom features, set or modify camera-based motion detection, tripwire, and/or low light detection parameters, and/or otherwise manage operation of cameras. For example, camera control interface 332 may maintain a video camera configuration table, pages, or similar data structures that includes entries for each video camera being managed and their respective camera-specific configuration parameters, active control features (such as PTZ control), and other configuration and control information for managing the cameras. In some embodiments, each camera may be assigned a unique camera identifier that may be used by surveillance controller 330, analytics engine 340, and/or surveillance application 350 to associate video data with the camera from which it was received.

In some embodiments, camera control interface 332 may include control signals, commands, or messages for manipulating specific features of one or more cameras. For example, camera control interface 332 may include a control signal for IR filter control 332.1. In some embodiments, IR filter control 332.1 may include an API and corresponding logic for enabling and/or disabling an infrared blocking filter in the selected camera by sending command messages or signals to the camera. In some embodiments, camera control interface 332 may include a low light detector 332.2 configured to detect a low light condition in real-time video streams received from the video camera. For example, a low light condition may be determined from an average or other statistical analysis of illumination or light intensity of the pixels in one or more frames of video data. The light intensity value or values may be compared against one or more low light threshold values for determining a low light condition. In some embodiments, IR filter control 332.1 may disable the IR blocking filter of the camera responsive to low light detector 332.2 detecting the low light condition. In some embodiments, low light detector 332.2 and/or response logic for IR filter control 332.1 may include a response delay threshold that requires that the low light condition persist for a period of time or number of frames before disabling the IR filter, to prevent unnecessary switching for transient light conditions. In some embodiments, the functions of enabling and disabling the IR filter in response to detecting the low light condition may be embodied in similar hardware and/or software functions within each video camera and camera control interface 332 may merely enable the low light filter response feature through a camera configuration parameter.

Video capture interface 334 may include camera interface protocols and a set of functions, parameters, and data structures for receiving video streams from associated cameras. For example, video capture interface 334 may include video data channels and related data buffers for managing a plurality of camera video data streams. In some embodiments, each video camera may be allocated a dedicated video channel for continuously and/or selectively sending its video stream to video capture interface 334. Video capture interface 334 may be configured to pass each received video stream to video storage interface 336, analytics engine 340, and/or access/display manager 338. For example, received video streams may be buffered by video capture interface before being streamed to video storage interface 336 and split into dual video streams with different video parameters for analytics engine 340 and access/display manager 338. In some embodiments, video capture interface 334 may receive camera video metadata describing the camera video format, time and location information, and event or condition tags based on on-board camera analytics. Video capture interface 334 may generate additional video metadata for video format changes and provide video metadata to video storage interface 336 and/or other components.

In some embodiments, video capture interface 334 may include a video stream manager 336.1 configured to identify and manage the plurality of video streams being received from the cameras. For example, video stream manager 336.1 may manage video buffer allocation and space, processing of video streams from a camera video format to another video format, flushing of buffered video to storage through video storage interface 336 and/or for display via access/display manager 338. In some embodiments, video stream manager 336.1 may send video streams to analytics engine 340 for analysis and/or provide a notification to analytics engine 340 of the availability and storage location of video data for analysis in non-volatile memory 320 (as determined by video storage interface 336). In some embodiments, video stream manager 334.1 may include configurable video paths 334.2. For example, the storage path (through video storage interface 336), the display path (through access/display manager 338), and/or the analytics path (through analytics engine 340) may each be configured for specific processing, priority, and timing. In some embodiments, video stream manager 334.1 may be configured to use encoder/decoder 334.3 to decode camera video streams in a first (camera) video format and re-encode them in one or more other formats. For example, video stream manager 334.1 may use encoder/decoder 334.2 to change the resolution, image size, frame rate, codec, compression factor, color/gray-scale, or other video format parameters. In some embodiments, a different video stream format may be configured for each video path 334.2. For example, a full spectrum color video stream may be processed through the storage and/or analytics path, while a full spectrum gray scale video stream may be processed through the display path.

Video storage interface 336 may include storage interface protocols and a set of functions, parameters, and data structures for managing storage of video data in non-volatile memory 320, such as storage devices and/or network video storage, for later retrieval and use by access/display manager 338 and/or analytics engine 340. For example, video storage interface 336 may write camera video stream data from video data buffers and/or storage path video data from video capture interface 334 to non-volatile memory 320. In some embodiments, video storage interface 336 may include a storage manager 336.1 configured to manage video storage space in non-volatile memory 320 in accordance with one or more data retention and/or data archiving schemes. For example, surveillance system 300 may support continuous and/or triggered recording of video data from associated cameras and storage manager 336.1 may include logic for enforcing a data retention and overwriting policy whereby the fixed storage space of non-volatile memory 320 is recycled for storing a recent period of captured video, video data meeting specific retention criteria, and/or deleting or archiving video data after one or more periods of time defined in the data retention policy. Video storage interface 336 may also receive and store video metadata 320.4 as tags or metadata tracks in the video data or in an associated metadata table, file, or similar data structure associated with the corresponding video data objects.

In some embodiments, video storage interface 336 may be configured to video in multiple formats to support two more video streams or use cases. For example, multiple video paths 334.2 may pass through non-volatile memory 320 and be managed by video storage interface 336. For example, a dual video path configuration for low light video storage may include a user video format 336.2 and an analytics video format 336.3. In some embodiments, video storage interface 336 may receive two or more video streams derived from the same camera video stream, where each processed video stream from video capture interface 334 is in a different format. For example, user video format 336.2 may be configured to store IR filtered video 320.1 for normal light conditions and gray scale video 320.2 for low light conditions. Analytics video format 336.2 may be configured to use the same IR filtered video 320.1 for normal light conditions and store a separate full spectrum color video 320.3 for low light conditions. In some embodiments, storage manager 336.1 assigns or receives storage locations for stored video data and provides the storage locations corresponding to the different video paths to the respective consumer components. For example, storage manager 336.1 may provide the storage location for user video format 336.2 to access/display manager 338 and analytics video format 336.3 to analytics engine 340.

Access/display manager 338 may include APIs and a set of functions, parameters, and data structures for displaying video from video capture interface 334 and/or video storage interface 336 to a user display application, such as surveillance application 350. For example, access/display manager 338 may include a monitoring or display configuration for displaying one or more video streams in real-time or near real-time on a graphical user display of a user device and/or receive video navigation commands from the user device to selectively display stored video data from non-volatile memory 320. In some embodiments, access/display manager 338 may maintain an index of real-time/near real-time video streams and/or stored or archived video streams that are available for access by surveillance application 350. In some embodiments, the video index may include a corresponding metadata index that includes video data parameters (e.g., time, location, camera identifier, format, low light/normal light, etc.), detected video event metadata (event time, location, type, parameters, etc.), and/or video management parameters (expiration, active/archive, access control, etc.) for use in displaying and managing video data. Access/display manager 338 may be configured to support surveillance application 350 when instantiated in the same computing device as surveillance controller 330, directly attached to the computing device hosting surveillance controller 330, and/or via a network within a LAN, WAN, VPN, or the internet. In some embodiments, access/display manager 338 may provide selective access to user video format 336.2 and/or video streams allocated by video capture interface 334 to the user video path. For example, access/display manager 338 may serve the user video stream to surveillance application 350 with IR filtered color video for normal light conditions and gray scale video for low light conditions.

Analytics engine 340 may include interface protocols, functions, parameters, and data structures for analyzing video data to detect video events, add them to video metadata, and/or raise alerts, such as through surveillance application 350. For example, analytics engine 340 may be an embedded firmware application and corresponding hardware in a network video recorder configured for local analysis of video data captured from associated video cameras and may be integral to or accessible by surveillance controller 330. In some embodiments, analytics engine 340 may run on a separate computing device from surveillance controller 330, such as a video camera with analytics capabilities, a dedicated analytics appliance, data storage system with analytics capabilities, or a cloud-based analytics service. In some embodiments, analytics engine 340 may operate in real-time or near real-time on video data received by video capture interface 334, delayed processing of video data stored by video storage interface 336, and/or a combination thereof based on the nature (and processing requirements) of the video events, volume of video to be processed, and other factors. In some embodiments, surveillance system 200 may comprise a plurality of analytics engines configured for a particular type of event and corresponding event detection algorithm or model.

In some embodiments, analytics engine 340 may include a plurality of hardware and/or software modules configured to use processor 312 and memory 314 to handle or manage defined operations of analytics engine 340. For example, analytics engine 340 may include an event manager 342, analytical model library 344, and training service 346. Analytics engine 340 may be configured to run one or more event detection algorithms for determining, tagging, and/or initiating alerts or other actions in response to detected video events. In some embodiments, analytics engine 340 may be configured to tag or build metadata structures that map detected events to time and image location markers for the video stream from which they are detected. For example, analytics engine 340 may use motion, tripwire, object recognition, facial recognition, audio detection, speech recognition, and/or other algorithms to determine events occurring in a video stream and tag them in a corresponding metadata track and/or separate metadata table associated with the video data object.

Event manager 342 may include storage interface and/or buffer interface protocols and a set of functions, parameters, and data structures for processing target video streams for predefined event types and updating or adding metadata parameters describing the detected video events. For example, event manager 342 may be configured to process all incoming video streams for surveillance controller 330 and/or selectively process video data based on user selections (through surveillance application 350) or metadata criteria received from the video camera or video capture interface 334. In some embodiments, event manager 342 may include a video selector 342.1 configured to select target video streams or video data sets for analysis. For example, video selector 342.1 may identify a real-time video stream for near real time analysis or a bounded video data set, such as video with a specified camera identifier and timestamps between beginning and ending time markers and/or including a defined set of metadata parameters. Event manager 342 may include an event type selector 342.2 configured to determine one or more event types to be detected from the selected video data. For example, an analytics configuration may be configured to analyze the selected video stream for a predefined set of motion detection, tripwire detection, object recognition, facial recognition, audio detection, speech recognition, and/or similar video event types. Each event type may map or correspond to an analytical model type, set of parameters, and one or model weights for defining an event detection algorithm stored in analytical model library 344 for use by analytics engine 340 to detect potential video events. In some embodiments, video streams and/or portions thereof may be tagged with low light condition markers or tags. For example, the originating video camera and/or video capture interface 334 may embed time markers and low light condition tags for video portions captured using low light settings. In some embodiments, event manager 342 may be configured to determine a low light condition from the light, color, and/or wavelength bandwidth present in the video data and add appropriate tags. Low light conditions may be used by event type selector 342.2 to determine that low light analytical models should be used for event detection, rather than normal light analytical models. In some embodiments, event manager 342 may include detected event handling logic for determining response to detection of one or more detected events. For example, a metadata manager 342.3 may add one or more detected event tags to video metadata 320.4 and/or send an alert or notification to access/display manager 338 for communication to surveillance application 350.

Analytical model library 344 may include an API and set of functions, parameters, and data structures for storing a plurality of analytical models for use by analytics engine 340 in processing video data. For example, analytical model library 344 may include a plurality of trained analytical models and corresponding event detection algorithms for different event types, target parameters (e.g. cars, license plates, equipment, people, etc.), and/or training conditions. Each analytical model may include a set of base equation(s) for the analytical model type, set of target parameters, and one or model weights that determine the event detection algorithm that will be used for the event detection processing. In some embodiments, analytical model library 344 may include different sets of analytical models for different video conditions. For example, analytical model library 344 may include normal light models 344.1, trained using normal light training data and having corresponding normal light model weights, and low light models 344.2, trained using low light training data and having corresponding low light model weights.

In some embodiments, analytics engine 340 may include or access training service 346 for generating or updating analytical models in analytical model library 344. Training service 346 may include APIs and functions, parameters, and data structures for iteratively training analytical models to generate effective model weights for detecting the target events from captured video data. Training data selector 346.1 may be configured to target a set of training video data, such as training video data 320.5 in non-volatile memory 320, for training a particular event detection algorithm. For example, training data selector 346.1 may be used to select a set of video data that has previously been tagged with the video events of the event type of interest. In some embodiments, training video 320.5 may include different training video data sets for different video types and conditions. For example, training data selector 346.1 may select low light video data, such as full spectrum color video captured during low light conditions, for training low light events and low light analytical models 344.2 and select normal light video data, such as IR filtered color video captured during normal light conditions, for training normal light events and normal light analytical models 344.1. Training processor 346.2 may be configured to iteratively process the selected training video data using the target analytical model until an accuracy threshold is met for detecting the video events of interest in the training data set. Each iteration by training processor 346.2 may modify one or more model weights values 346.3. When the accuracy threshold is reached, training service 346 may return the model weight values 346.3 to store or update the corresponding analytical model and event detection algorithm in analytical model library 344.

Surveillance application 350 may include interface protocols, functions, parameters, and data structures for providing a user interface for monitoring and reviewing surveillance video and/or managing surveillance system 300, such as through surveillance controller 330. For example, surveillance application 350 may be a software application running on a user device integral to, connected to, or in network communication with surveillance controller 330 and/or a hosting network video recorder. In some embodiments, surveillance application 350 may run on a separate computing device from surveillance controller 330, such as a personal computer, mobile device, or other user device. In some embodiments, surveillance application 350 may be configured to interact with APIs presented by access/display manager 338.

In some embodiments, surveillance application 350 may include a plurality of hardware and/or software modules configured to use processor 312 and memory 314 to handle or manage defined operations of surveillance application 350. For example, surveillance application 350 may include a video manager 352, an alert manager 354, and an analytics manager 356.

Video manager 352 may include APIs and a set of functions, parameters, and data structures for navigating and displaying video streams from video cameras accessed through surveillance controller 330. For example, video manager 352 may include a graphical user interface and interactive controls for displaying lists, tables, thumbnails, or similar interface elements for selecting and displaying video streams for particular cameras, times, locations, and/or events. In some embodiments, video manager 352 may enable split screen display of multiple camera video streams. For example, the near real-time video streams (with a predetermined lag based on network lag, storage, and processing times) from all active cameras may be displayed on a monitoring interface or a set of video streams corresponding to a detected event may be displayed in an event review interface. In some embodiments, video manager 352 may include a data structure summarizing all video data stored in surveillance system 300 to enable the user to locate and view older surveillance video. For example, a video management log or database may include entries for stored video data indexed by related metadata, such as video data parameters (e.g., time, location, camera identifier, format, low light/normal light, etc.), detected video event metadata (event time, location, type, parameters, etc.), and/or video management parameters (expiration, active/archive, access control, etc.).

In some embodiments, video manager 352 may be configured to provide gray scale video display 352.1 on the graphical user interface of the user device. For example, video manager 352 may receive a gray scale video stream from access/display manager 338 as part of a display path triggered by low light conditions when the video as captured. In some embodiments, video manager 352 may receive a color video stream with a low light condition metadata tag from access/display manager 338 and include a gray scale processor or filter that may be applied to the color video stream to replace it with a corresponding gray scale video stream before displaying to a user. In some embodiments, video manager 352 may include an event overlay function 352.2 configured to overlay metadata tags and/or video event indicators on video streams being displayed to the user. For example, video manager 352 may read video metadata provided with the video stream to be displayed and determine one or more visual indicators, such as alphanumeric tags, graphical boxes or tiles, still or video image insets, etc., based on the video metadata. In some embodiments, event overlay function 352.2 may be responsive to event parameters in the video metadata and/or event parameters in an event alert received by alert manager 354. For example, event overlay function 352.2 may determine low light event parameters (e.g., event type, time, and location) from video metadata and/or alert manager 354, generate a corresponding low light event indicator from the low light event parameters, and overlay the low light event indicator on gray scale display 352.1.

Alert manager 354 may include APIs and a set of functions, parameters, and data structures for setting, monitoring, and displaying alerts based on detected video events. For example, the user may define a set of trigger events that generate visual, audible, tactile, and/or notification-based (electronic mail, text message, automated call, etc.) alerts to a user device. In some embodiments, alert manager 354 may include a plurality of preset alert conditions with associated event parameters and allow a user to enable and disable alert types and/or change associated event parameters. In some embodiments, alert manager 354 may be configured to operate in conjunction with event overlay function 352.2 to overlay graphical elements representing detected events or event indicators on video streams displayed through video manager 352. For example, detected motion, objects, or faces may be boxed or highlighted, tagged with relevant identifiers, or otherwise indicated in the video playback on the user device.

Analytics manager 356 may include APIs and a set of functions, parameters, and data structures for selecting, training, and managing event detection algorithms. For example, analytics manager 356 may include a user interface to analytical model library 344 for one or more analytics engines 340. In some embodiments, the event detection algorithms may include a set of parameters and/or model weights that are preconfigured based on training data sets processed independent of surveillance system 300. For example, analytics manager 356 may include object detection algorithms for common objects, situations, and camera configurations. In some embodiments, analytics manager 356 may include access to training service 346 and/or preconfigured training data sets. For example, analytics manager 356 may enable the user to define training data sets for determining or refining event detection algorithm parameters and/or model weights based on predefined base algorithms or models. In some embodiments, analytics manager 356 may interface directly with analytics engine 340 for selecting, training, managing, and using the event detection algorithms configured through analytics manager 356. In some embodiments, analytics manager 356 may interface with access/display manager 338 for accessing and managing one or more analytics engines 340.

Figure 4:
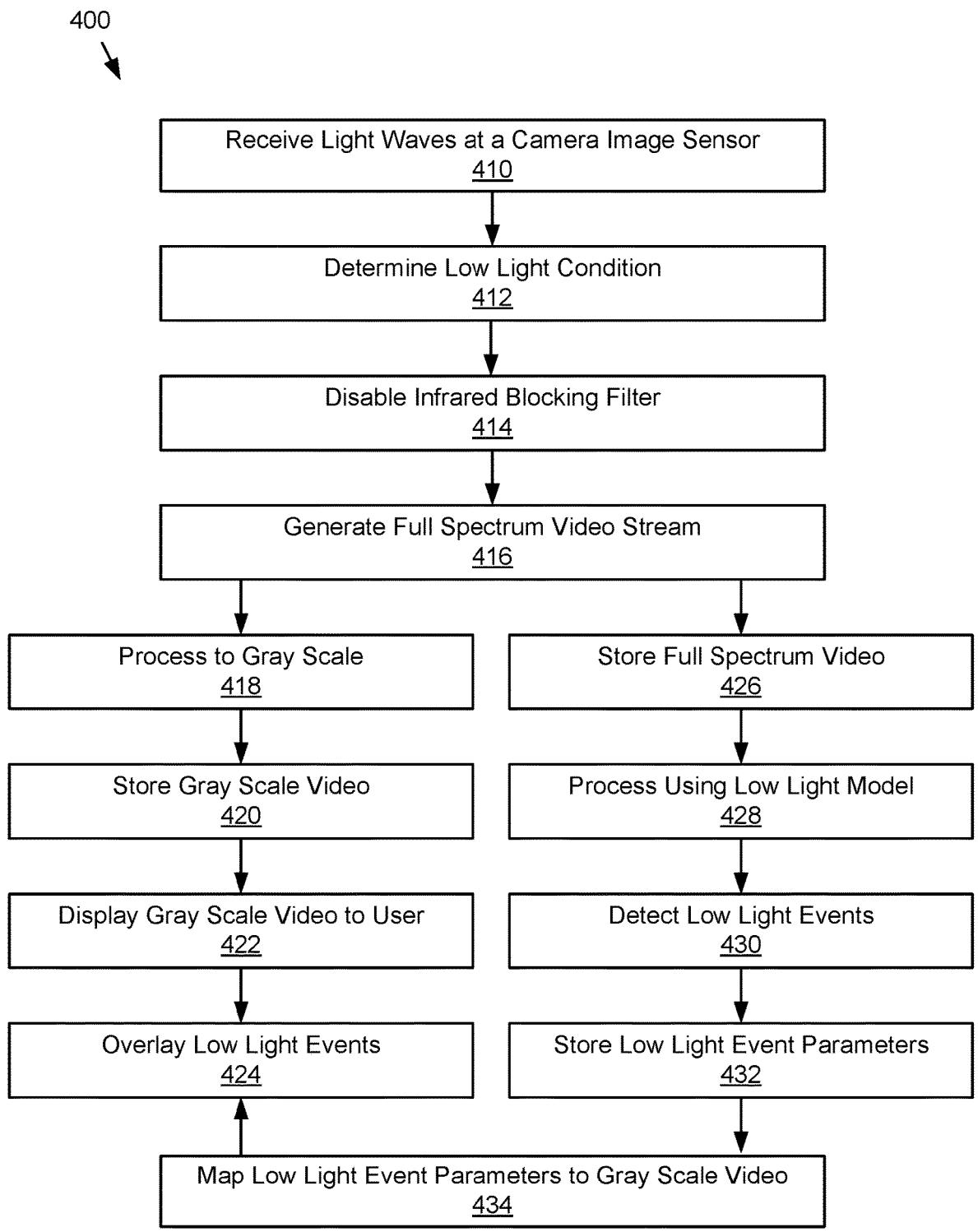
FIG. 4 is a flowchart of an example method of handling low light video using dual video streams.

As shown in FIG. 4, surveillance system 300 may be operated according to an example method for handling low light video using dual video streams, i.e. according to method 400 illustrated by blocks 410-434 in FIG. 4.

At block 410, light waves may be received at a video camera image sensor. For example, the video camera may activate to capture video continuously or responsive to a trigger condition.

At block 412, a low light condition may be determined. For example, the video camera may include a low light detection circuit in its control circuit or the video stream from the video camera may be processed by a surveillance controller equipped with a low light detection circuit or algorithm.

At block 414, an infrared blocking filter may be disabled responsive to the determination of the low light condition. For example, the video camera may be configured to automatically disable the infrared blocking filter in response to a low light condition or the surveillance controller may send a command message or signal to disable the infrared blocking filter.

At block 416, a full spectrum video stream may be generated responsive to disabling the infrared blocking filter. For example, with the infrared blocking filter removed, a full spectrum of light may reach the video camera image sensor and convert to video signal data across the entire bandwidth of the image sensor, including near infrared wavelengths. In some embodiments, the full spectrum video stream may be encoded at the video camera and provided as a camera video stream to the surveillance controller.

At block 418, the full spectrum video stream may be processed to a gray scale video stream. For example, the surveillance controller may determine a display path for the video stream and process the full spectrum video stream for that path to gray scale, such as by decoding and reencoding the video data with a gray scale filter or applying a gray scale filtering algorithm compatible with the encoded video stream format.

At block 420, the gray scale video stream may be stored. For example, the surveillance controller may store the gray scale video data to non-volatile memory configured for storing video data from the video camera.

At block 422, the gray scale video stream may be displayed to a user. For example, a surveillance application running on a user device may receive the gray scale video stream from the surveillance controller and selectively display it on a graphical user interface of the user device. In some embodiments, blocks 420 and 422 may be executed in parallel by duplicating the gray scale video stream and/or the gray scale video stream may be displayed to the user prior to being stored.

At block 424, low light events detected from the full spectrum video stream may be overlaid on the gray scale video displayed to the user. For example, the surveillance application may generate low light event indicators and overlay them on the graphical user display in response to receiving low light event parameters mapped to the gray scale video stream at block 434.

At block 426, the full spectrum color video may be stored. For example, the surveillance controller may determine an analysis path for the video stream and store the full spectrum color video data to the non-volatile memory.

At block 428, the full spectrum color video may be processed using a low light analytics model. For example, an analytics engine may process the full spectrum color video using a low light analytics model trained to detect video events from video streams with a low light condition.

At block 430, low light events may be detected using the low light analytics model. For example, the analytics engine may detect one or more low light video events from the video stream and generate corresponding low light event parameters.

At block 432, low light event parameters may be stored. For example, the analytics engine may store the low light event parameters corresponding to the detected events in video metadata associated with the full spectrum color video stream.

At block 434, the low light event parameters may be mapped to the gray scale video stream. For example, the analytics engine, surveillance controller, or surveillance application may use the time and location markers for the detected low light event in the color video stream to determine corresponding times and locations in the gray scale vide stream to enable the low light event indicators to be overlaid on the gray scale video.

Figure 5:
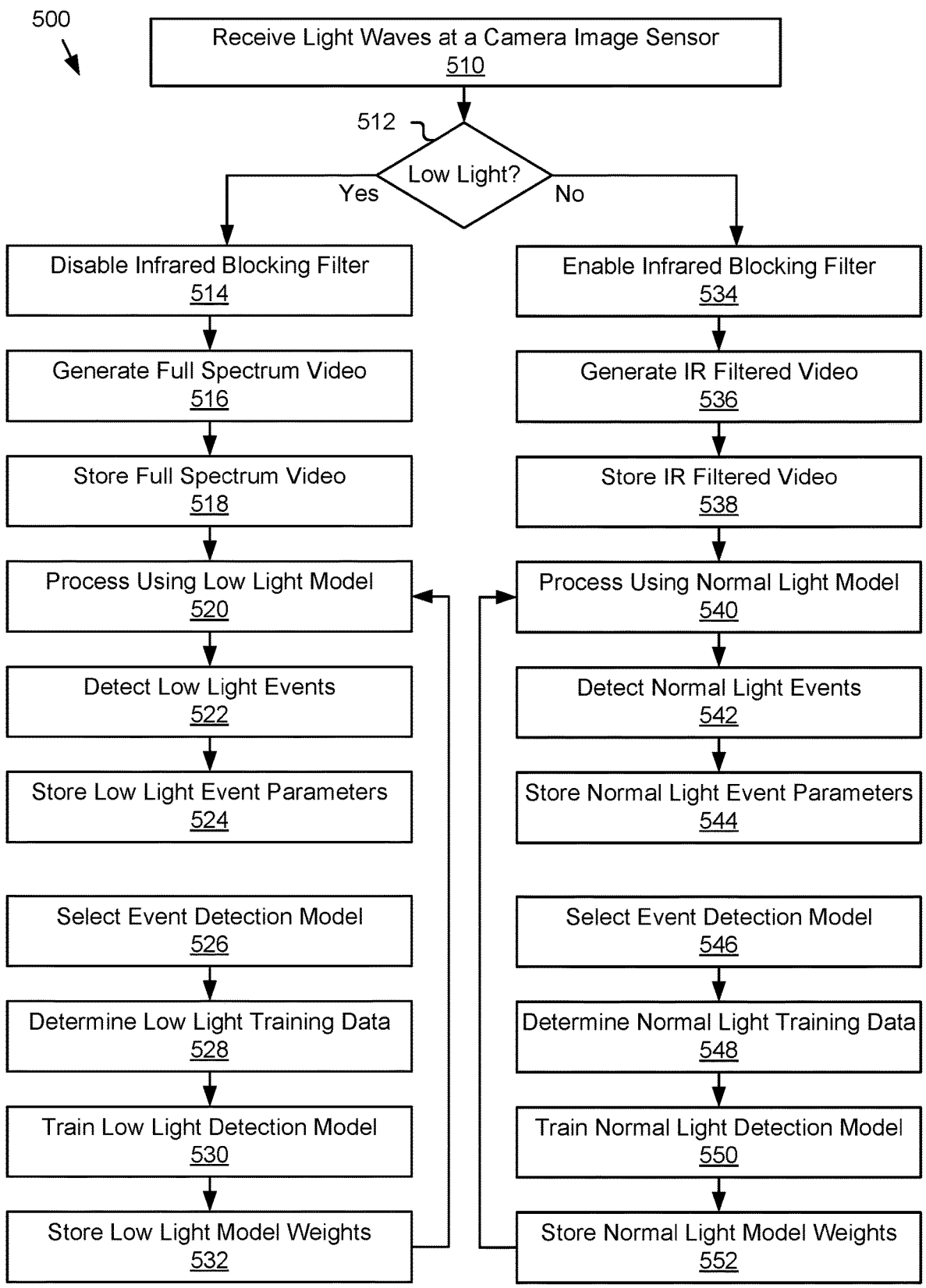
FIG. 5 is a flowchart of an example method of separately processing low light and normal light video data.

As shown in FIG. 5, surveillance system 300 may be operated according to an example method for separately processing low light and normal light video data, i.e. according to method 500 illustrated by blocks 510-552 in FIG. 5.

At block 510, light waves may be received at a video camera image sensor. For example, the video camera may activate to capture video continuously or responsive to a trigger condition.

At block 512, whether or not a low light condition is present may be determined. For example, the video camera may include a low light detection circuit in its control circuit or the video stream from the video camera may be processed by a surveillance controller equipped with a low light detection circuit or algorithm. If a low light condition is detected, method 500 may proceed to block 514 for low light processing. If a low light condition is not detected, method 500 may proceed to block 534 for normal light processing.

At block 514, an infrared blocking filter may be disabled responsive to the determination of the low light condition. For example, the video camera may be configured to automatically disable the infrared blocking filter in response to a low light condition or the surveillance controller may send a command message or signal to disable the infrared blocking filter.

At block 516, a full spectrum video stream may be generated responsive to disabling the infrared blocking filter. For example, with the infrared blocking filter removed, a full spectrum of light may reach the video camera image sensor and convert to video signal data across the entire bandwidth of the image sensor, including near infrared wavelengths. In some embodiments, the full spectrum video stream may be encoded at the video camera and provided as a camera video stream to the surveillance controller.

At block 518, the full spectrum video stream may be stored. For example, the surveillance controller may store the full spectrum video data to non-volatile memory configured for storing video data from the video camera.

At block 520, the full spectrum video may be processed using a low light analytics model. For example, an analytics engine may process the full spectrum color video using a low light analytics model trained to detect video events from video streams with a low light condition.

At block 522, low light events may be detected using the low light analytics model. For example, the analytics engine may detect one or more pre-determined low light video events of interest from the video stream and generate corresponding low light event parameters.

At block 524, low light event parameters may be stored. For example, the analytics engine may store the low light event parameters corresponding to the detected events in video metadata associated with the full spectrum color video stream.

In some embodiments, the low light analytics model used for event detection at blocks 520 and 522 may have been trained using low light training data. At block 526, an event detection model may be selected. For example, the analytics engine may include base event detection models that may be selected based on the event type to be detected and a corresponding model may be selected for training purposes.

At block 528, low light training data may be determined. For example, the analytics engine may include or have access to training data sets that include video data with low light conditions that have previously been tagged with the target event types.

At block 530, the low light event detection model may be iteratively trained. For example, the analytics engine may iteratively process the selected training data set to refine model weight values associated with the low light event detection model until a threshold accuracy is achieved.

At block 532, the determined model weights for the low light event detection model may be stored. For example, the analytics engine may store a low light event detection algorithm based on the low light event detection model, including the model weights, in an analytics model library for use in processing low light video streams at blocks 520 and 522.

At block 534, an infrared blocking filter may be enabled responsive to the determination of a normal light condition. For example, the video camera may be configured to default to and enable the infrared blocking filter in response to a normal light condition or the surveillance controller may send a command message or signal to enable the infrared blocking filter if it has previously been disabled.

At block 536, an infrared filtered video stream may be generated responsive to enabling the infrared blocking filter. For example, with the infrared blocking filter active, a filtered spectrum of light that excludes wavelengths in the near infrared spectrum and above may reach the video camera image sensor and convert to video signal data across only the visible light spectrum. In some embodiments, the infrared filtered video stream may be encoded at the video camera and provided as a camera video stream to the surveillance controller.

At block 538, the infrared filtered video stream may be stored. For example, the surveillance controller may store the infrared filtered video data to non-volatile memory configured for storing video data from the video camera.

At block 540, the infrared filtered video may be processed using a normal light analytics model. For example, an analytics engine may process the infrared filtered color video using a normal light analytics model trained to detect video events from video streams with a normal light condition.

At block 542, normal light events may be detected using the normal light analytics model. For example, the analytics engine may detect one or more pre-determined normal light video events of interest from the video stream and generate corresponding normal light event parameters.

At block 544, normal light event parameters may be stored. For example, the analytics engine may store the normal light event parameters corresponding to the detected events in video metadata associated with the infrared filtered color video stream.

In some embodiments, the normal light analytics model used for event detection at blocks 540 and 542 may have been trained using normal light training data. At block 546, an event detection model may be selected. For example, the analytics engine may include base event detection models that may be selected based on the event type to be detected and a corresponding model may be selected for training purposes. In some embodiments, the same base event detection model may be selected based on the same event type at both blocks 526 and 546 and the resulting analytical models may be differentiated only by the different model weights generated through training.

At block 548, normal light training data may be determined. For example, the analytics engine may include or have access to training data sets that include video data with normal light conditions that have previously been tagged with the target event types.

At block 550, the normal light event detection model may be iteratively trained. For example, the analytics engine may iteratively process the selected training data set to refine model weight values associated with the normal light event detection model until a threshold accuracy is achieved.

At block 552, the determined model weights for the normal light event detection model may be stored. For example, the analytics engine may store a normal light event detection algorithm based on the normal light event detection model, including the model weights, in an analytics model library for use in processing normal light video streams at blocks 540 and 542.

Figure 6:
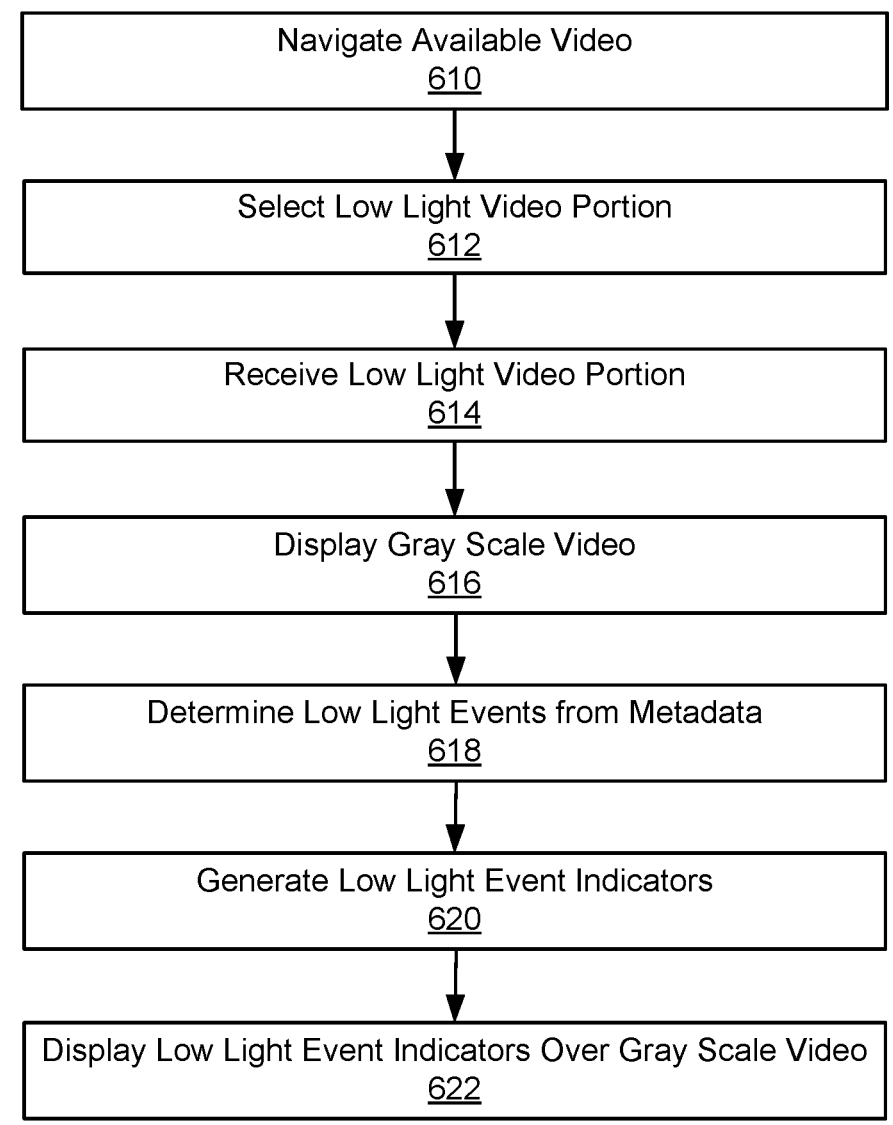
FIG. 6 is a flowchart of an example method of displaying low light event indicators on gray scale video.

As shown in FIG. 6, surveillance system 300 may be operated according to an example method for displaying low light event indicators on gray scale video, i.e. according to method 600 illustrated by blocks 610-622 in FIG. 6.

At block 610, available video may be navigated through a graphical user interface. For example, a surveillance application running on a user device may provide a video navigation interface that enables selection, display, and navigation of a video stream, such as play, pause, stop, forward, reverse, faster, slower, etc.

At block 612, a low light video portion may be selected. For example, the surveillance application may enable a user to select a video stream segment for viewing that has been tagged as having a low light condition.

At block 614, the low light video portion may be received. For example, the surveillance application may retrieve the selected video stream segment from stored or streaming video data managed by a surveillance controller.

At block 616, the low light video portion may be displayed as gray scale video. For example, the video stream segment received at block 614 may be a gray scale video or the surveillance application may apply a gray scale filter to the video stream segment prior to displaying it on the user device.

At block 618, one or more low light events may be determined from video metadata. For example, the surveillance application may receive video metadata associated with the video stream segment with the video stream segment and the video metadata may include low light event parameters that the surveillance application parses from the video metadata.

At block 620, at least one low light event indicator may be generated. For example, the surveillance application may generate a low light event indicator based on the low light event parameters from the video metadata.

At block 622, the at least one low light event indicator may be displayed over the gray scale video. For example, the surveillance application may overlay low light event indicators at a time and position in the gray scale video corresponding to the low light event parameters for the particular low light event.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

The invention claimed is:

1. A system, comprising:
a video camera comprising:
an image sensor; and
an infrared blocking filter; and
a controller, comprising a first memory and a first processor, configured to:
determine a low light condition;
disable, responsive to determining the low light condition, the infrared blocking filter;
send a first video stream from the image sensor to a user device for displaying the first video stream; and
send a second video stream from the image sensor to an analytics engine, wherein:

the analytics engine is stored in a second memory for execution by a second processor configured for processing, using a first analytical model, the second video stream; and the first analytical model is configured to detect low light events from a full spectrum video stream from the image sensor.

2. The system of claim 1, wherein the controller is further configured to process, prior to sending the first video stream to the user device, the first video stream into a gray scale video stream.

3. The system of claim 1, further comprising the user device, wherein the user device comprises:
a third processor;
a third memory;
a graphical user display configured for selectively displaying the first video stream to a user of the user device; and
an input device configured for selectively navigating the first video stream on the graphical user display.

4. The system of claim 1, further comprising the analytics engine, wherein the analytics engine is further configured to use
a second analytical model to detect normal light events from an infrared filtered video stream.

5. The system of claim 4, wherein:
the analytics engine is further configured to send, responsive to detected low light events, low light event parameters to the controller; and
the controller is further configured to map the low light event parameters to the first video stream.

6. The system of claim 5, further comprising the user device, wherein:
the user device comprises a third processor and a third memory; and
the user device is configured to:
receive the first video stream and the low light event parameters;
display the first video stream as a gray scale video on a graphical user display; and
overlay, based on the low light event parameters, at least one low light event indicator on the gray scale video.

7. The system of claim 4, wherein the analytics engine is further configured to:
determine a set of low light training data comprising pre-determined low light events in full spectrum video data;
iteratively train, using the set of low light training data, the first analytical model;
determine, based on the iterative training, a set of low light model weights for the first analytical model; and
apply the set of low light model weights to processing the second video stream.

8. The system of claim 7, wherein the analytics engine is further configured to:
determine a set of normal light training data comprising pre-determined normal light events in infrared filtered video data;
iteratively train, using the set of normal light training data, the second analytical model;
determine, based on the iterative training, a set of normal light model weights for the second analytical model; and apply, responsive to the controller determining a normal light condition, the set of normal light model weights to processing a normal light video stream from the image sensor.

9. The system of claim 1, further comprising:
a video storage device, comprising a non-volatile storage medium, configured to store the first video stream in the non-volatile storage medium; and
the user device, wherein:
the user device comprises a third processor and a third memory; and
the user device is configured to:
selectively retrieve a portion of the first video stream from the video storage device; and
display the portion of the first video stream on a graphical user display of the user device.

10. The system of claim 9, further comprising the analytics engine configured to detect low light events from the second video stream, wherein:
the video storage device is further configured to store the second video stream; and
the analytics engine is further configured to selectively retrieve the second video stream from the video storage device for processing.

11. A computer-implemented method, comprising:
determining a low light condition for a video camera, wherein the video camera comprises:
an image sensor; and
an infrared blocking filter;
disabling, responsive to determining the low light condition, the infrared blocking filter;
sending a first video stream from the image sensor to a user device; and
detecting, using a first analytical model in an analytics engine, low light events from a second video stream, wherein the second video stream is a full spectrum video stream from the image sensor.

12. The computer-implemented method of claim 11, further comprising:
processing, prior to sending the first video stream to the user device, the first video stream into a gray scale video stream.

13. The computer-implemented method of claim 11, further comprising:
displaying, on a graphical user display of the user device, the first video stream to a user of the user device; and
selectively navigating, using an input device of the user device, the first video stream on the graphical user display.

14. The computer-implemented method of claim 11, further comprising:
detecting, using a second analytical model in the analytics engine, normal light events from an infrared filtered video stream captured by the video camera during a normal light condition.

15. The computer-implemented method of claim 14, further comprising:
mapping low light event parameters corresponding to the detected low light events from the second video stream to the first video stream.

16. The computer-implemented method of claim 15, further comprising:
receiving, at the user device, the first video stream and the low light event parameters;
displaying, on a graphical user display of the user device, the first video stream as a gray scale video; and overlaying, based on the low light event parameters, at least one low light event indicator on the gray scale video.

17. The computer-implemented method of claim 14, further comprising:
   determining a set of low light training data comprising pre-determined low light events in full spectrum video data;
   iteratively training, using the set of low light training data, the first analytical model;
   determining, based on the iterative training, a set of low light model weights for the first analytical model; and
   applying the set of low light model weights to processing the second video stream.

18. The computer-implemented method of claim 17, further comprising:
   determining a set of normal light training data comprising pre-determined normal light events in infrared filtered video data;
   iteratively training, using the set of normal light training data, the second analytical model;
   determining, based on the iterative training, a set of normal light model weights for the second analytical model; and
   applying, responsive to determining a normal light condition, the set of normal light model weights to processing a normal light video stream from the image sensor.

19. The computer-implemented method of claim 18, further comprising:
   storing the first video stream and the second video stream in a video storage device;
   selectively retrieving, by the user device, a first portion of the first video stream from the video storage device;
   displaying the first portion of the first video stream on a graphical user display of the user device;
   selectively retrieving, by the analytics engine, a second portion of the second video stream from the video storage device for processing; and
   detecting low light events from the second portion of the second video stream.

20. A storage system, comprising:
   a video camera comprising:
      an image sensor; and
      an infrared blocking filter;
   a processor;
   a memory;
   means for determining a low light condition for the video camera;
   means for disabling, responsive to determining the low light condition, the infrared blocking filter;
   means for displaying a first video stream from the image sensor on a graphical user display,
      wherein the first video stream is a gray scale video stream; and
   means for detecting low light events from a second video stream from the image sensor, wherein the means for displaying the first video stream overlays detected low light events from the second video stream on the first video stream.

* * * * *